Dec. 28, 1948.                J. C. RENFROE                2,457,273
                               SPINDLE ADAPTER
                            Filed Nov. 17, 1947
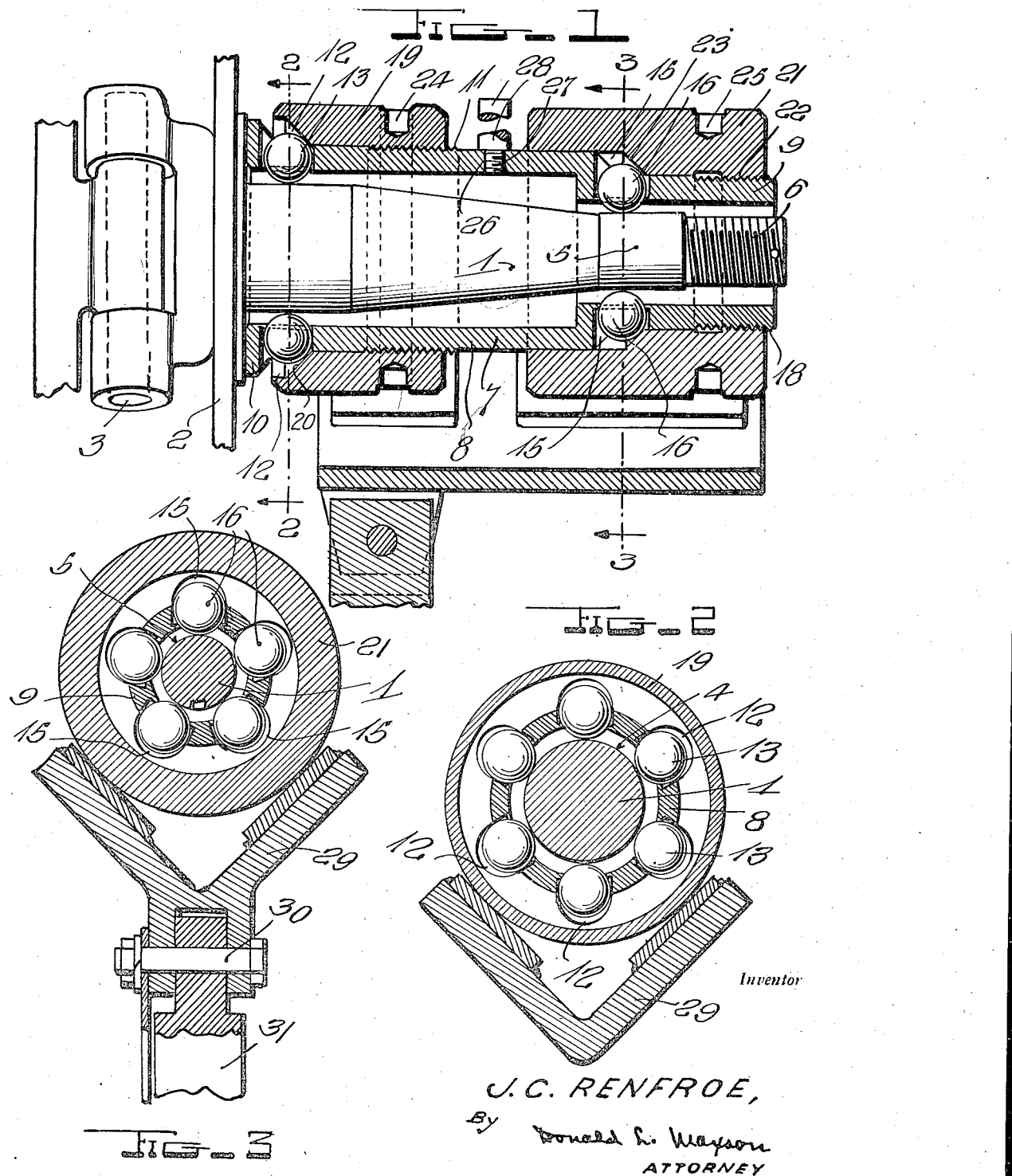
Inventor
J. C. RENFROE,
By  Donald L. Mayson
                 ATTORNEY Patented Dec. 28, 1948

2,457,273

UNITED STATES PATENT OFFICE 2,457,273

SPINDLE ADAPTER

Joseph C. Renfroe, Jacksonville, Fla.

Application November 17, 1947, Serial No. 786,341

4 Claims. (Cl. 308—190)

This invention relates to improvements in spindle adapters.

An object of the invention is to provide an improved spindle adapter for positioning upon the front wheel axle spindles after the wheels have been removed so that the same may be supported in a suitable machine or apparatus while tests are being made to determine king pin inclination, degree of camber and caster, degree of toe in or out, and for axle alignment.

Another object of the invention is to provide an improved form of axle spindle adapter comprising a spindle adapter sleeve which is tubular in shape and is stepped and of reduced diameter from its inner end to its outer end, together with means formed through the wall of the spindle for supporting ball bearings for engaging the outer surface of an axle spindle, and inner and outer cylindrical hubs or bushings formed with angularly disposed bearing surfaces engageable with said ball bearings when said hubs or bushings are threaded upon the axle spindle.

A further object of the invention is to provide an improved axle spindle adapter which will include a ball bearing sleeve disposable upon the wheel spindle, and detachable threaded hubs or bushings of different interior diameters threadable on the axle spindle for assuring proper and perfect support of the axle spindle when placed in the V-shape yoke of a spindle testing machine or apparatus.

Another object of the invention is to provide an improved axle spindle adapter which will be highly efficient in operation, and relatively inexpensive to manufacture and produce.

Other objects will appear as the description proceeds.

In the accompanying drawings which form a part of this application,

Figure 1 is a vertical longitudinal sectional view through the improved spindle centering sleeve showing the same applied upon an axle spindle and supported in the yoke of an axle spindle testing machine or apparatus;

Figure 2 is a sectional view taken on the line 2—2 of Figure 1, and

Figure 3 is a sectional view taken on the line 3—3 of Figure 1.

Like characters of reference are used throughout the following specification and the accompanying drawings to designate corresponding parts.

In carrying out the invention, there is provided and illustrated an axle spindle 1 extending outwardly from the housing plate 2 for a front wheel of a motor vehicle (not shown), the same being pivotally supported upon the usual king pin 3.

The axle spindle 1 is of the usual construction, being outwardly tapered and formed with inner and outer cylindrical bearing surfaces 4 and 5 of respectively large and small diameter. The outer end of the spindle 1 is externally threaded as at 6.

The improved axle spindle sleeve 7 is tubular in shape and is stepped with the inner and outer portions 8 and 9 being of large and small diameter respectively. The inner end of the sleeve 7 is formed with a laterally extending peripheral flange 10 for engaging and lying flush against the housing plate 2 when the adapter is in position on the axle spindle 1.

The intermediate tubular portion of the spindle sleeve is externally threaded as at 11, and the larger portion 8 of the sleeve is radially bored to provide the housings 12 for the reception of ball bearings 13 which engage the large cylindrical bearing surface 4 on the spindle 1.

The outer reduced end 9 of the sleeve is also radially ported to provide housings 15 for the reception of the ball bearings 16 which contact and roll on the small cylindrical bearing surface 5 on the spindle 1.

The sleeve is externally threaded on its outer end as at 18 for purposes hereinafter described.

An inner cylindrical hub or bushing 19 is internally threaded on its outer end and is adapted to thread on the external threads 11 on the inner end of the sleeve until the hub or sleeve is in its proper position with the angular annularly disposed bearing surface 20 firmly contacting the ball bearings 13.

An outer stepped cylindrical hub or bushing 21 is internally threaded as at 22 in its outer end for threading upon the external threads 18 on the outer end of the sleeve 7. An angularly disposed annular bearing seat 23 is provided in the enlarged inner portion of the hub or bushing 21 for engaging and firmly contacting the ball bearings 16 when said hub or bushing 21 is in its proper position upon the axle spindle 1.

Radially extending spanner wrench openings or sockets 24 and 25 will be formed respectively in the hubs or bushings 19 and 21.

A radical threaded opening 26 will be formed through the central wall of the sleeve for detachably receiving the threaded inner end 27 of a hand lever 28 for rotating the sleeve upon the axle spindle 1.

A supporting yoke 29 is shown pivotally mounted upon a bearing pin 30 at the upper end of an arm 31 of a spindle testing machine or apparatus (not shown).

From the foregoing description it will be apparent that there has been devised and provided a highly efficient and relatively inexpensive axle spindle adapter for use in supporting an axle spindle while being tested.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim is:

1. An axle spindle adapter comprising an elongated, cylindrical sleeve having circumferentially disposed radial passages formed therethrough adjacent its opposite ends, ball bearings in said passages, and threaded hubs or bushings having angular circumferentially disposed bearing surfaces adapted to engage said ball bearings.

2. An axle spindle and an adapter therefor comprising an elongated stepped cylindrical sleeve formed with circumferentially disposed passages therethrough adjacent its opposite ends, ball bearings in said passages adapted to bear on said spindle, and threaded hubs or bushings having angular circumferentially disposed bearing surfaces threadable on said threaded sleeve adapted to engage said ball bearings.

3. An axle spindle and an adapter therefor comprising an elongated stepped cylindrical sleeve formed with circumferentially disposed passages therethrough adjacent its opposite ends, ball bearings in said passages adapted to bear on said spindle, threaded hubs or bushings having angular circumferentially disposed bearing surfaces threadable on said threaded sleeve adapted to engage said ball bearings, and said hubs being provided with spanner wrench sockets in their outer or peripheral surfaces.

4. An axle spindle and an adapter therefor comprising an elongated stepped cylindrical sleeve formed with circumferentially disposed passages therethrough adjacent its opposite ends, ball bearings in said passages adapted to bear on said spindle, threaded hubs or bushings having angular circumferentially disposed bearing surfaces threadable on said threaded sleeve adapted to engage said ball bearings, said hubs being provided with spanner wrench sockets in their outer or peripheral surfaces, said sleeve being formed with a radial threaded bore, and a threaded handle in said threaded bore.

JOSEPH C. RENFROE.

REFERENCES CITED

The following references are of record in the file of this patent:

UNITED STATES PATENTS

| Number | Name | Date |
| --- | --- | --- |
| 2,010,210 | Witt | Aug. 6, 1935 |